July 20, 1954  F. LYIJYNEN  2,684,313
ANNULAR ESCUTCHEON MEMBER FOR A LAMINATED STRUCTURE
AND A LAMINATED STRUCTURE, INCLUDING
SAID ESCUTCHEON MEMBER
Filed July 26, 1950  2 Sheets-Sheet 1
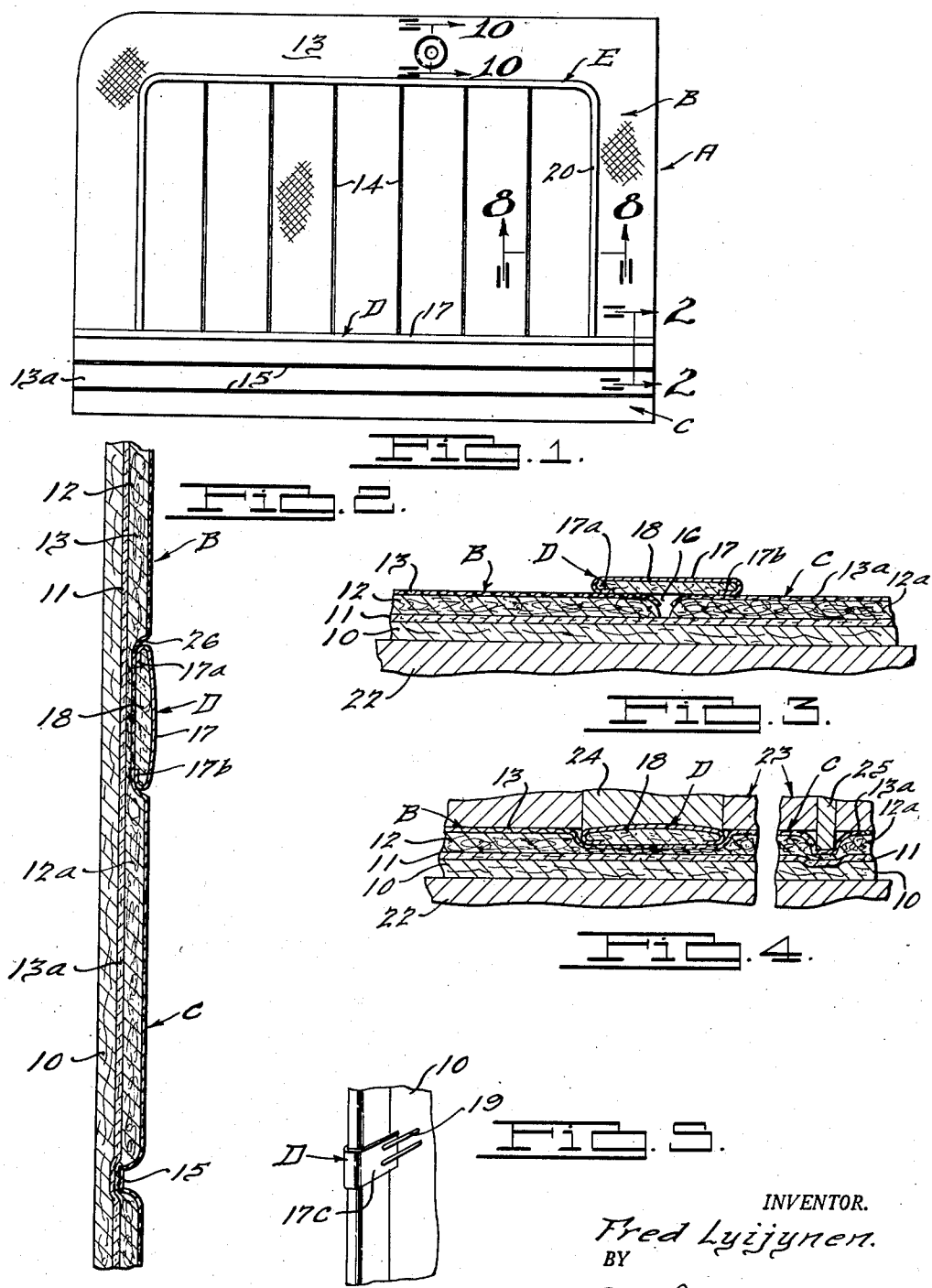
INVENTOR.
Fred Lyijynen.
BY
Elmer Jamison Gray
ATTORNEY.

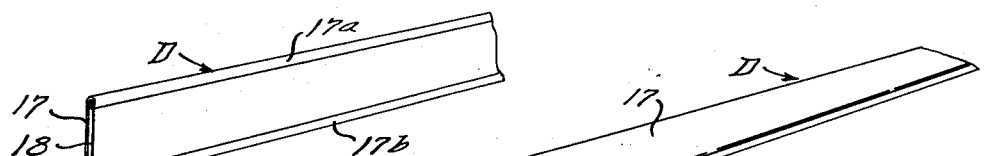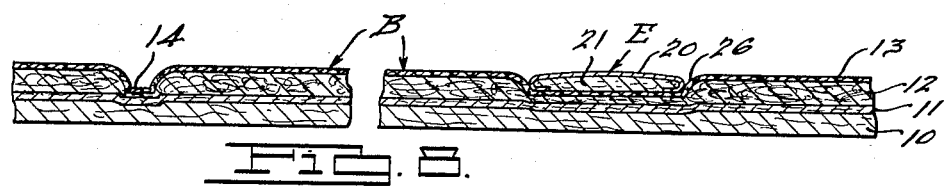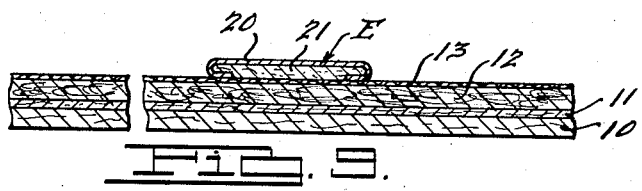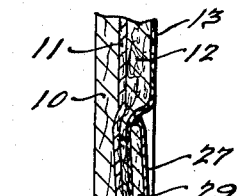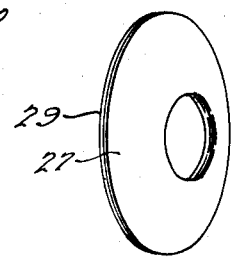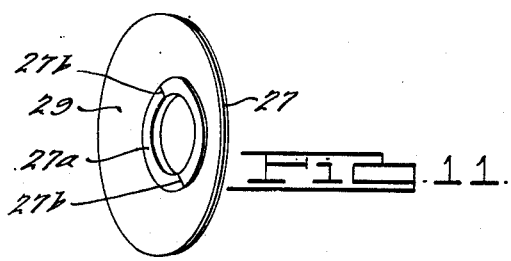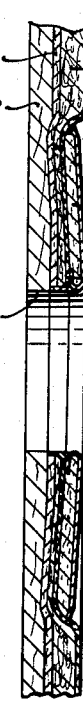

Patented July 20, 1954

2,684,313

UNITED STATES PATENT OFFICE 2,684,313

ANNULAR ESCUTCHEON MEMBER FOR A LAMINATED STRUCTURE AND A LAMINATED STRUCTURE, INCLUDING SAID ESCUTCHEON MEMBER

Fred Lyijynen, Detroit, Mich., assignor to Briggs Manufacturing Co., Detroit, Mich., a corporation of Michigan Application July 26, 1950, Serial No. 175,980

2 Claims. (Cl. 154—43)

1

This invention relates generally to articles, such as trim panels, formed of laminations of sheet material bonded together, and is particularly useful in connection with panels utilized for trimming the interiors of automobile or other vehicle bodies. In the fabrication of panels or articles of the foregoing type, it is frequently the practice to apply to the exposed faces of the articles moldings, medallions, escutcheons, or comparable elements of bright metal such as chromium or stainless steel, for decorative or display purposes. The present invention relates particularly to improvements in such ornamental metal moldings or elements and to the fabrication of laminated panels or articles employing such moldings or elements.

In the manufacture of trim panels for automobile bodies, such as for finishing the insides of the doors thereof, it is customary to consolidate together the several panel laminations in a press between heated platens or dies and thereafter apply the metal moldings to the panel and attach them in place at the desired locations. One conventional type of molding comprises a channel piece having an outer bright finish and a specially formed metal insert or strip interlocked in the channel and formed with lanced out prongs or fasteners. In order to attach such a molding to the panel the latter must be pierced to provide holes spaced apart in accordance with the spacing of the prongs on the molding. Then the molding is applied to the panel, the prongs are passed through the holes in the panel and clinched over the back face thereof. Not only are these metal moldings relatively expensive but their assembly with the panels is time consuming and costly due to the manual operations involved and the consequent delays in production.

An object of the present invention is to eliminate the use of separately applied metal moldings or elements of like nature used on the laminated articles for ornamental or display purposes and to provide a laminated panel or article and a method of making the same in which the molding or like element is attached to the panel during the consolidation of the laminations thereof.

Further objects of the invention are to provide an improved metallic molding, escutcheon, medallion, or element of like nature having a sheet of resin impregnated material secured thereto, as for example by marginal flanges of the molding or element folded around the edges of the impregnated sheet; and to provide a method and means whereby the metallic molding or element is secured to the panel or laminated article at least in

2 part by the resin in the impregnated sheet and simultaneously shaped to the desired contour within the press during the operation of bonding the laminations of the panel together.

Still another object is to provide a molding which may be bonded to the panel during the press operation, such molding comprising a channel shaped metal strip, which may be foil-like in character, carrying an insert strip of resin impregnated material within the channel thereof, the molding being consolidated with the panel at least in part through the medium of the resin contained in the insert strip.

Other objects of this invention will appear in the following description and appended claims, reference being had to the accompanying drawings forming a part of this specification wherein like reference characters designate corresponding parts in the several views.

Fig. 1 is a top plan view of a trim panel constructed in accordance with one embodiment of the present invention.

Fig. 2 is an enlarged fragmentary section taken substantially through lines 2—2 of Fig. 1 looking in the direction of the arrows.

Fig. 3 is an enlarged fragmentary section illustrating the component parts of the panel in their assembled relation prior to the consolidation thereof in a press.

Fig. 4 is a fragmentary sectional view illustrating the operation of consolidating together the component parts illustrated in Fig. 3.

Fig. 5 is a fragmentary perspective view illustrating the manner in which one of the moldings is folded at its end around the edge of the panel and attached to the back thereof prior to the press operation.

Fig. 6 is a fragmentary perspective view of the underside of a composite molding constructed in accordance with one embodiment of the present invention.

Fig. 7 is a sectional perspective view showing a portion of the trim side of the molding.

Fig. 8 is an enlarged fragmentary section taken substantially through lines 8—8 of Fig. 1 looking in the direction of the arrows.

Fig. 9 is an enlarged fragmentary sectional view illustrating the component parts of Fig. 8 prior to the press operation.

Fig. 10 is an enlarged fragmentary section taken substantially through lines 10—10 of Fig. 1, looking in the direction of the arrows.

Fig. 11 is a fragmentary perspective view of the underside of the composite escutcheon plate shown in Fig. 10.

Fig. 12 is a perspective view showing the trim side of the escutcheon plate.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

For the purpose of illustrating one manner in which the invention may be utilized, there is illustrated in Fig. 1 by way of example a trim panel A of the type which may be used as a finish trim on the inside of an automobile body, such as on the door thereof. Trim panels of this type are frequently fabricated with a main upper area B, which may be covered with fabric or cloth with an underlying layer of padding, and a lower rather narrower area C, often termed a kick-pad, which may also be padded and covered usually with a layer of more durable material, such as carpeting, imitation leather, or a layer of fabric of different color, appearance or characteristics than the upper covering layer. It is often the practice to attach ornamental metal moldings to the face of the panel. Accordingly the panel A is shown with an ornamental molding D secured along the juncture of the areas B and C and a second molding E secured to the area B, these moldings being formed and applied as described hereinafter.

In general the trim panel made in accordance with the present invention comprises a stiff foundation board 10, a relatively thick paper sheet 11 overlying the foundation board, a layer of padding or wadding 12 superimposed upon the sheet 11, and an outer facing sheet or covering layer 13. Where, as in the present instance, the trim panel is divided into the above mentioned areas B and C, the covering 13 for the area B preferably comprises a cloth or fabric material. The covering for the kick-pad area C may also have a padding or wadding layer 12a overlying the sheet 11 and covered with a suitable fabric material or sheet 13a which may, as stated above, be in the form of carpeting or imitation leather or other desired material.

The foundation 10, sheets 11, 12 and 13, as well as sheets 12a and 13a, are assembled in superimposed relation as shown in Fig. 3. These laminations are then subjected to a pressing operation during which they are heated under pressure and consolidated or unified so as to unite or bond the laminations together. In the present instance the laminations are in part secured or bonded together along ornamental lines defined by relatively deep indentations or grooves, such as the vertical grooves 14 in the upper area B of the panel and the longitudinal grooves 15 in the kick-pad area C. The arrangement of these grooves or indentations shown in Fig. 1 is purely for illustrative purposes. It will be apparent that the lines or localities at which the laminations are pressed and bonded together may be varied as to configuration or otherwise in order to produce any desired pattern or design.

In assembling the laminations to provide the areas B and C of the panel, the foundation 10 and paper sheet 11 may be continuous to provide a backing corresponding to the full area of the panel. The padding layers 12 and 12a as well as the fabric or covering layers 13 and 13a are applied as separate sheets in the embodiment of Fig. 3, having a gap or space 16 therebetween which may vary considerably in width. The gap or space 16 between the layers 12 and 13 and the layers 12a and 13a is closed by means of the ornamental molding D which, as later described, is attached permanently in place by a bonding operation with the application of heat and pressure during the operation of forming the indentations or grooves 14 and 15. Thus in the assembly of the component parts of the panel, preparatory to the press operation, the molding D is placed in position in a manner generally similar to that illustrated in Fig. 3. Also in the assembly of the component parts preparatory to the press operation, the molding E is placed in position upon the panel so as to engage the fabric layer 13 covering the upper area B of the panel, as shown in Fig. 9.

The foundation sheet or board 10 is preferably formed from a rigid stiff board material providing the desired support for the remaining laminations of the panel. In some instances the material of the foundation board or sheet 10 may be made moisture resistant by impregnation with a resin or an asphalt or bituminous material. However, in the present instance the trim panel, as intended for use on the interior of an automobile body, may utilize a heavy composition fibre board, such as Masonite board, which is not impregnated or treated for moisture resistant purposes.

The resinous or bonding material used for consolidating together the laminations of the trim panel along the lines 14 and 15 is in the present instance contained entirely in the sheet 11. The resinous or bonding material for uniting the laminations together at the localities of the moldings D and E is contained in part in the sheet 11 and in part in the composite molding element, as later more fully described. The sheet 11 preferably comprises a low density absorbent sheet of cellulosic material, such as alpha cellulose or pulp paper, which is not only highly absorbent but also compressible under the action of the die during the hot pressing operation. This sheet is treated or impregnated with a bonding substance preferably in the form of a thermoplastic or thermosetting resin, such as a phenol formaldehyde product, or any known phenolic resin, or a urea formaldehyde resin. Where a resin of this character is used as the bonding agent, it is preferable to convert the resinous substance into a varnish by dissolving it in a suitable solvent. The sheet 11 may be impregnated by immersion in the varnish to saturate the fibers of the sheet. By controlling the percentage of resin contained in the varnish, the desired amount of resin introduced into the sheet 11 may be readily controlled in order to produce the desired bonding action without the presence of excess resin. After impregnation the sheet 11 is dried to expell the volatile solvents, the resinous material remaining in the sheet being partially reacted or polymerized so as to be capable of further reaction or curing when subjected to heat from the heated platens or dies during the pressing operation.

The wadding or padding layer 12, 12a comprises any suitable soft deformable material capable of being employed for cushioning the outer surface of the panel. Cotton batting or multiple layers of crepe paper may be used satisfactorily for this purpose. The outer covering layers 13 and 13a may be made of any suitable finishing material, such as those hereinbefore mentioned. Although I prefer to utilize the compressible sheet 11 for carrying the resin or bonding material, since this sheet will readily take impressions from the die, it will be understood that the sheet 11 in some instances may be dispensed with and the bonding material applied directly to the layers of padding or wadding 12 and 12a or to the foundation board 10.

The moldings D and E are preferably similar in cross sectional construction, each being in the form of a composite strip comprising an outer metal strip in channel form carrying an insert strip preferably treated or impregnated with a bonding substance compatible with the bonding substance contained in the sheet 11. Thus, the molding D comprises a thin channel shaped metal strip 17 of preferably bright metal within which a strip 18 is confined. The metal strip 17 may be wrapped or folded snugly around the edges of the insert strip 18, which operation may be accomplished in any automatic machine, thereby providing folded portions 17a and 17b underlying and engaging the bottom of the strip 18 and spaced apart a suitable distance to expose a predetermined area of the strip 18 at the underside of the molding. It will be understood that the metal strip 17 may first be formed in channel shape after which the strip 18 is inserted into the channel. Since the molding D extends the full width of the panel, I prefer to provide the metal strip 17 with extensions 17c beyond the ends of the insert strip 18, so that after placing the molding D in place, the extensions 17c at opposite ends of the molding may be folded around the side edges of the panel and anchored to the underside of the foundation sheet 10 by means of staples 19, see Fig. 5.

The molding E is similar to the molding D in that it also comprises a thin channel shaped metal strip 20, preferably of bright metal, within which is confined an insert strip 21 similar to the strip 18. Since the ends of the molding E do not extend to the edges of the panel, the metal strip 20 has the same length as the insert strip 21.

The metal strips 17 and 20 of the moldings D and E are preferably quite thin and foil-like in character, although metal having gages ranging from approximately .001 of an inch to approximately .010 of an inch have proved satisfactory. The material employed may be of any suitable metal having a bright colored finish, such as chromium, stainless steel, or any other bright metal suitable for decorative purposes. The insert strips 18 and 21 may be of any suitable thickness and are preferably formed of the same paper or pulp material as the sheet 11. These insert strips are preferably treated or impregnated with a bonding agent which may be similar to the bonding agent contained in the sheet 11. It will be seen that when the composite moldings D and E are placed in position as indicated in Figs. 3 and 9, predetermined areas of the impregnated insert strips 18 and 21 will be exposed between the turned-under folds or flanges of the metal strips 17 and 20.

With the component parts of the panel in assembled relation, the assembled unit is introduced into a suitable press for the purpose of consolidating all of the parts together. The press, which is preferably of the hydraulic type, is provided with heated lower and upper platens or dies 22 and 23. The upper platen 23 is provided with a die member 24 suitably shaped and of a size to engage the molding D over the full length thereof. The platen is also provided with a similar die engaging the molding E over the full length thereof, and is also provided with die members 25 for forming the indentations or grooves 14 and 15.

When the press is closed, the relatively deep indentations 14 and 15 are formed. Since the resin impregnated sheet 11 is relatively thick and compressible, these grooves or indentations extend partially into this sheet, as illustrated in Figs. 2, 4 and 8, the wadding or padding being compacted at the locality of the indentations. Along these lines of indentation 14 and 15, the resinous material in the sheet 11 will flow through the compressed wadding or padding material 12, 12a and will penetrate to some extent the top covering layers 13, 13a along the base of the indentations sufficiently to consolidate these layers together at these localities. In addition the resinous material will effect a permanent bond between the fabric, wadding layers, and the foundation board 10 in the locality of the grooves or indentations 14 and 15 where pressure is applied by the dies. During the press operation the temperature and pressure will be so regulated that the resinous material in the sheet 11 is cured or brought to a final stage of reaction or polymerization. As a consequence, the layers of the panel will be securely and permanently bonded together upon completion of the curing or reaction of the resin while substantial areas of the panel between the lines of indentation 14 and 15 will remain uncompressed so as to give the panel as a whole a soft upholstered effect.

During the press operation the die members 24 engage the molding strips D and E and force them into the panel by compressing the underlying portions of the padding and also by compressing to some extent the relatively soft paper sheet 11. During this operation the resinous material in the strips 18 and 21 effect a permanent bond between the strips and the outer foil-like metal strips 17 and 20. Furthermore the resinous material in the insert strips 18 and 21 flows and merges with the resinuous material in the sheet 11, thus effecting a permanent bond therebetween. Also the resinous material in the insert strips and in the sheet 11 permanently bond the edges of the moldings to the underlying portions of the fabric materials 13 and 13a as well as the underlying portions of the padding material. The compressive forces applied to the moldings D and E produce impressions or channels 26 within which the moldings are confined, so that the upper surfaces thus may lie substantially or nearly flush with the upper adjacent surfaces of the panel. By thus depressing the moldings into the upper surface of the panel, a more desirable appearance is achieved. By consolidating the parts of the moldings to the underlying portions of the panel, the moldings become a permanent substantially integral part of the panel incapable of coming loose during use. The use of a foil-like metal in the moldings results in a very efficient bonding action between the metal foil and the insert strip, which is permanent in character. By rolling or folding the metal foil underneath the edges of the insert strip, as shown at 17a and 17b, ease in assembly is achieved, since the composite strip may be stored, transported, and handled readily, while also enabling the edge of the metal foil to be entirely concealed.

The dies 24 may be shaped to any suitable contour in order to impart to the top of the molding a corresponding contour, such as a crowned or angular effect. It is thus possible to press or contour the molding in any desired manner during the pressing operation.

Figs. 10, 11 and 12 show an application of the present invention comprising an annular escutcheon plate 27 bonded to the outer panel layer 13 around an opening 28 for the shaft of a window regulator. The plate 27 is formed from light gage sheet metal of the general character of the molding strips D and E and carries an annular concentric sheet or disc 29. The latter is of the same or similar material as the sheet 11 and inserts 18, 21 and is similarly impregnated with a suitable bonding agent or resin. A flange 27a of the plate 27 is folded snugly around the inner edge of the impregnated disc 29 to hold the same in place prior to the bonding operation. Accordingly the composite escutcheon 27, 29 is readily stored, transported, and handled as a unit prior to the bonding operation. The thickness of the plate 27 is preferably somewhat greater than the usual metallic foil, so that a number of short circumferentially spaced radial slits 27b are cut in the flange 27a to facilitate its folding around the adjacent inner edge of the impregnated disc 29. The outer edge of the plate 27 slightly overlaps the outer edge of the disc 29 in order to conceal the latter in the final bonded position.

In application, the escutcheon assembly 27, 29 is placed on the cover layer 13 concentrically around the opening 28 prior to the bonding operation at the same time the moldings D and E are placed in position on the layers 13, 13a. The entire panel is then completed in a single bonding operation between the heated platens 22 and 23 of the press as discussed above. Similar to the forming die 24, a suitably contoured annular die presses the escutcheon plate 27 against the underlying panel layers, compacting the padding 12 and recessing the outer edge of the plate 27 appreciably below the adjacent uncompacted area of the panel. Under the heat and pressure of the bonding operation, the resin in the impregnated sheets 29 and 11 permeates the fabric layer 13 and padding 12 and fuses to complete a positive permanent bond between plate 27 and panel layers. Likewise similar to the edges of the strips D and E, the recessed marginal edge of the plate 27 is protected against being accidentally snagged and pulled loose from the underlying panel layers to which it is bonded.

I claim:

1. An annular escutcheon member adapted to be bonded to the outer face of a laminated structure around an opening therein, comprising a disc of material treated with a bonding substance effective to form a bond under heat and pressure and a thin metal disc entirely covering the exterior surface of said treated disc, said discs having registering apertures adapted to register with said opening in the structure, the outer circular edge of said metal disc substantially concealing the corresponding edge of the treated disc and the inner edge of the metal disc around the aperture being folded around the corresponding edge of said treated disc into contact with the underside thereof, said metal disc being pressed into contact with said treated disc to provide a pre-formed unitary escutcheon member, the inner folded edge and the outer edge of said metal disc being spaced apart to provide beneath the treated disc an annular exposed bonding area capable of contact with and being bonded to the face of the structure upon the application of heat and pressure to the escutcheon member.

2. A laminated structure including a top sheet, an underlying padding sheet having an opening therein and a decorative annular escutcheon member bonded to the outer face of said structure, said member comprising a disc of material treated with a bonding substance effective to form a bond under heat and pressure and a thin metal disc entirely covering the exterior surface of said treated dics, said discs having registering apertures adapted to register with said opening in the structure, the outer edges of said metal disc substantially concealing the corresponding edge of the treated disc and the inner edge of the metal disc around the aperture being folded around the corresponding edge of said treated disc into contact with the underside thereof, said metal disc being pressed into contact with said treated disc to provide a pre-formed unitary escutcheon member, the inner folded edge and the outer edge of said metal disc being spaced apart to provide beneath the treated disc an annular exposed bonding area capable of contact with and being bonded to the face of the structure upon the application of heat and pressure to the escutcheon member.

References Cited in the file of this patent

UNITED STATES PATENTS

| Number | Name | Date |
|---|---|---|
| 335,569 | Dalpe | Feb. 9, 1886 |
| 1,874,462 | Crowther | Aug. 30, 1932 |
| 2,003,752 | Landt | June 4, 1935 |
| 2,232,762 | Batcheller | Feb. 25, 1941 |
| 2,278,141 | Warth | Mar. 31, 1942 |
| 2,504,874 | Prance | Apr. 18, 1950 |
| 2,581,195 | Lyijynen | Jan. 1, 1952 |